United States Patent
Jung et al.

(10) Patent No.: US 10,603,991 B2
(45) Date of Patent: Mar. 31, 2020

(54) BRACKET-INTEGRATED DOUBLE-LAYER DOOR IMPACT BEAM, APPARATUS AND METHOD FOR MANUFACTURING THE SAME

(71) Applicants: Hyundai Motor Company, Seoul (KR); Kia Motors Corporation, Seoul (KR); Seojin Industrial Co., Ltd., Gunpo, Gyeonggi-do (KR)

(72) Inventors: Youn-Il Jung, Seoul (KR); Ho-Jung Jeong, Gyeonggi-do (KR)

(73) Assignees: Hyundai Motor Company, Seoul (KR); Kia Motors Corporation, Seoul (KR); Seojin Industrial Co., Ltd., Gunpo, Gyeonggi-do (KR)

( * ) Notice: Subject to any disclaimer, the term of this patent is extended or adjusted under 35 U.S.C. 154(b) by 151 days.

(21) Appl. No.: 15/810,473

(22) Filed: Nov. 13, 2017

(65) Prior Publication Data

US 2018/0162205 A1 Jun. 14, 2018

(30) Foreign Application Priority Data

Dec. 14, 2016 (KR) .................. 10-2016-0170705

(51) Int. Cl.
*B60J 5/04* (2006.01)
*C21D 9/08* (2006.01)
(Continued)

(52) U.S. Cl.
CPC .............. *B60J 5/0443* (2013.01); *B21C 37/08* (2013.01); *B21C 37/0815* (2013.01);
(Continued)

(58) Field of Classification Search
CPC ...... B60J 5/0437; B60J 5/0443; B60J 5/0429; B60J 5/0451; B60J 5/0444; B60J 5/0416;
(Continued)

(56) References Cited

U.S. PATENT DOCUMENTS

| 6,020,039 | A | * | 2/2000 | Cline | ................... B60J 5/0444 |
| | | | | | 296/146.6 |
| 2015/0151616 | A1* | | 6/2015 | Makowski | ............ B60J 5/0456 |
| | | | | | 296/146.6 |

(Continued)

FOREIGN PATENT DOCUMENTS

| JP | H09141327 A | 6/1997 |
| JP | 3002508 B2 | 1/2000 |

(Continued)

*Primary Examiner* — D Glenn Dayoan
*Assistant Examiner* — Sunsurraye Westbrook
(74) *Attorney, Agent, or Firm* — Mintz Levin Cohn Ferris Glovsky and Popeo, P.C.; Peter F. Corless (57) ABSTRACT

An apparatus for manufacturing a bracket-integrated double-layer door impact beam is provided. The apparatus includes a lower mold having a lower cavity formed with a base material molded to have a "U"-shaped cross section and a predetermined length. The base material is seated on the lower cavity. A lower electrode terminal is disposed in the lower mold to contact the base material. An upper mold has an upper cavity therein and is coupled with the lower mold to pressurize both end portions of the "U"-shaped cross section of the base material inward to form the base material with an "O"-shaped cross section. An upper electrode terminal is disposed in the upper mold to contact the base material.

20 Claims, 7 Drawing Sheets

(51) Int. Cl.

| | | |
|---|---|---|
| *B21D 53/88* | (2006.01) | |
| *B21D 22/28* | (2006.01) | |
| *B21D 22/20* | (2006.01) | |
| *B21D 47/01* | (2006.01) | |
| *B21D 51/10* | (2006.01) | |
| *B21C 37/08* | (2006.01) | |
| *B21D 5/01* | (2006.01) | |
| *B21C 37/14* | (2006.01) | |
| *C21D 1/673* | (2006.01) | |
| *C21D 1/42* | (2006.01) | |

(52) U.S. Cl.
CPC ............. *B21C 37/14* (2013.01); *B21D 5/015* (2013.01); *B21D 22/20* (2013.01); *B21D 22/201* (2013.01); *B21D 22/208* (2013.01); *B21D 22/28* (2013.01); *B21D 47/01* (2013.01); *B21D 51/10* (2013.01); *B21D 53/88* (2013.01); *B60J 5/048* (2013.01); *B60J 5/0437* (2013.01); *B60J 5/0458* (2013.01); *C21D 1/673* (2013.01); *C21D 9/08* (2013.01); *C21D 1/42* (2013.01); *C21D 2211/008* (2013.01); *Y02P 10/253* (2015.11)

(58) Field of Classification Search
CPC .... B60J 5/042; B29C 45/0005; B29C 45/006; B29C 45/14786; B29C 69/00; B29C 2045/14213; B29C 2045/14442
USPC ...... 296/146.6, 187.12, 193.06, 146.11, 37.1, 296/1.11, 202, 205, 203.03; 29/897.2, 29/527.1; 280/730.2, 802, 834
See application file for complete search history.

(56) References Cited

U.S. PATENT DOCUMENTS

| | | | | |
|---|---|---|---|---|
| 2016/0089817 | A1* | 3/2016 | Hundley | B29C 35/0266 264/496 |
| 2016/0288629 | A1* | 10/2016 | Hu | B22D 17/00 |
| 2016/0303952 | A1* | 10/2016 | Hoff | B60J 5/0423 |

FOREIGN PATENT DOCUMENTS

| | | |
|---|---|---|
| JP | 2004-359137 A | 12/2004 |
| KR | 10-2000-0043121 | 11/2001 |
| KR | 10-2016-0052858 A | 5/2016 |
| KR | 10-2016-0125147 A | 10/2016 |

* cited by examiner

(A-A' CROSS SECTION)

BRACKET-INTEGRATED DOUBLE-LAYER DOOR IMPACT BEAM, APPARATUS AND METHOD FOR MANUFACTURING THE SAME

CROSS-REFERENCE(S) TO RELATED APPLICATIONS

This application claims priority to Korean Patent Application No. 10-2016-0170705, filed on Dec. 14, 2016, which is incorporated herein by reference in its entirety.

BACKGROUND

Field of the Invention

The present invention relates to a bracket-integrated double-layer door impact beam, and an apparatus and method for manufacturing the same, and more particularly, to a bracket-integrated double-layer door impact beam, and an apparatus and method for manufacturing the same, in which only a part of the door impact beam that requires strength reinforcement is configured to have a double layer structure to secure high strength and light weight, and at the same time, a bracket is integrally formed with the impact beam, thereby reducing the number of parts of the apparatus.

Description of Related Art

A door impact beam for a vehicle is a safety device installed in a vehicle door to absorb an impact applied to the door of the vehicle, thereby protecting a passenger or a loaded freight. The impact beam is generally manufactured using a steel material, and high strength of the impact beam is advantageous for absorbing an impact applied from an outside force without being deformed due to the impact.

However, as the strength of the impact beam increases, brittleness also increases, thus the impact beam with high strength is likely to be fractured due to the impact. Since brittleness is in inverse proportion to elongation, as the strength of the impact beam increases, the elongation decreases. Since an existing impact beam uses a single steel pipe, to secure rigidity, an entire thickness increases, thus causing substantial increase in weight. Further, as the existing part uses a material with very high strength, a risk for a fracture at the time of deformation increases.

SUMMARY

The present invention provides to a bracket-integrated double-layer door impact beam, and an apparatus and method for manufacturing the same, in which only a part of the door impact beam that requires strength reinforcement is configured to have a double layer structure to secure high strength and decrease overall weight, and at the same time, a bracket is integrally formed with the impact beam, thereby reducing the number of parts required for the apparatus.

Other objects and advantages of the present invention can be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, an apparatus for manufacturing a bracket-integrated double-layer door impact beam may include: a lower mold having a lower cavity formed with a base material molded to have a "U"-shaped cross section and a predetermined length, wherein the base material is seated on an inner surface of the lower cavity; a lower electrode terminal disposed in the lower mold to contact the base material; an upper mold having an upper cavity therein and coupled with the lower mold to pressurize both end portions of the "U"-shaped cross section of the base material inward to cause the base material to have an "O"-shaped cross section; and an upper electrode terminal disposed in the upper mold to contact the base material. The apparatus may further include a power supply device configured to be electrically connected to each of the upper electrode terminal and the lower electrode terminal.

One surface of the lower electrode terminal may be exposed to an inner side of the lower cavity to contact the base material. The upper electrode terminal may contact the base material at the same time that the "O"-shaped cross section of the base material is formed. The upper electrode terminal may be formed to have an inverted triangle-shaped cross section, and a lower end portion of the inverted triangle may contact the both end portions of the "U"-shaped cross section of the base material.

As the base material simultaneously contacts the lower electrode terminal and the upper electrode terminal, the base material may be applied with a current and be induction-heated. An insulating layer may be formed at a surface of each of the upper cavity and the lower cavity. The insulating layer may include a bakelite resin. The upper mold and the lower mold may further include cooling water passages for cooling the heated base material, respectively.

In accordance with another exemplary embodiment of the present invention, a method for manufacturing a bracket-integrated double-layer door impact beam may include: preparing a base material in which a first steel plate and a second steel plate are stacked and bonded; primarily press-molding the base material to have a "U"-shaped cross section; secondarily press-molding the primarily press-molded base material to have an "O"-shaped cross section; and heat-treating the secondarily press-molded base material to increase strength of the first steel plate. The first steel plate may be a quenchable steel plate.

In the preparing of the base material, the second steel plate for reinforcing strength may be stacked on a central portion of the first steel plate having a rectangular shape in a width direction of the first steel plate, and the second steel plate may be longer than the first steel plate in a length direction. In the primary molding step, the cross section of the base material may have a "U"-shape, and the second steel plate may be positioned on an inner side of a bent portion of the "U"-shape.

In the primary molding step, the base material may be molded to be curved with a predetermined curvature to cause a central portion of the base material in the length direction of the base material to protrude toward the bent portion direction. The heat-treating step may include: heating the base material to an austenite transformation temperature or greater; and cooling the heated base material to transform a microstructure of the first steel plate into a martensite structure. The heating step may be performed by an induction heating. Bracket parts for fixing the door impact beam on an external panel of a vehicle door may be integrally formed with both end portions of the second steel plate in a length direction of the second steel plate.

In accordance with another exemplary embodiment of the present invention, a bracket-integrated double-layer door impact beam installed on a door panel for cushioning an impact applied to the vehicle may include: an external pipe configured to have a predetermined length and diameter and may be made of a quenchable steel material; and a strength reinforcing member configured to have a body part that has a half-pipe shape and is bonded to a lower inner circumference of the external pipe to reinforce strength of the external pipe, in which bracket parts for fixing the impact beam in the door panel are integrally formed with both end portions of the body part in a length direction of the body part, respectively.

Each of the bracket parts may be formed to protrude further than both end portions of the external pipe in a length direction of the external pipe. The strength of the external pipe may be greater than strength of the strength reinforcing member. The impact beam may be curved at a predetermined curvature to cause a central portion of the impact beam in the length direction of the impact beam to protrude in a direction in which the strength reinforcing member is bonded.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode. Therefore, the configurations described in the exemplary embodiments and drawings of the present invention are merely exemplary embodiments but do not represent all of the technical spirit of the present invention. Thus it should be understood that there may exist various equivalents and modifications for substituting those at the time of filing this application. Moreover, detailed descriptions related to well-known functions or configurations will be omitted in order not to unnecessarily obscure the gist of the present invention. Hereinafter, exemplary embodiments of the present invention will be described in detail with reference to the accompanying drawings.

Figure 2:
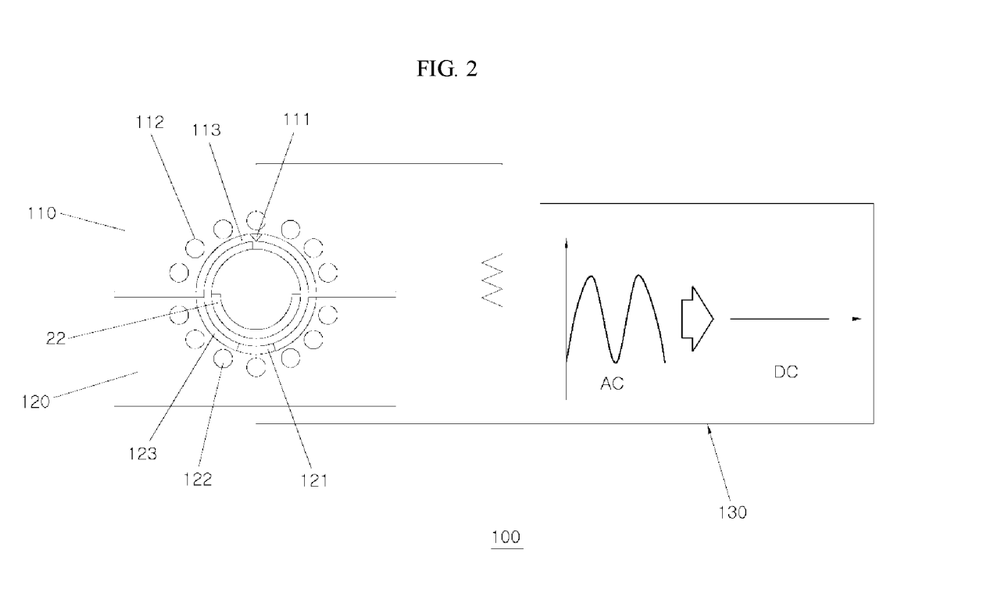
FIG. 2 is a diagram for describing an apparatus for manufacturing a bracket-integrated double-layer door impact beam according to an exemplary embodiment of the present invention.

FIG. 2 is a diagram for describing an apparatus for manufacturing a bracket-integrated double-layer door impact beam according to an exemplary embodiment of the present invention. Referring to FIG. 2, the apparatus for manufacturing a bracket-integrated double-layer door impact beam according to an exemplary embodiment of the present invention may include a lower mold 120 having a lower cavity formed with a base material molded to have a "U"-shaped cross section and a predetermined length, wherein the base material is seated on an inner surface of the lower cavity; a lower electrode terminal 121 disposed in the lower mold 120 to contact the base material; an upper mold 110 having an upper cavity therein and coupled with the lower mold to pressurize both end portions of the "U"-shaped cross section of the base material inward to cause the base material to have an "O"-shaped cross section; and an upper electrode terminal 111 disposed in the upper mold 110 to contact the base material.

The apparatus for manufacturing a bracket-integrated double-layer door impact beam according to an exemplary embodiment of the present invention may further include a power supply device electrically connected to each of the upper electrode terminal 111 and the lower electrode terminal 121, and each of the electrode terminals may contact the base material, thereby making the base material to be in a conducting state.

Additionally, the lower electrode terminal 121 may be formed to be embedded in the lower mold 120, with one surface of the lower electrode terminal 121 exposed to an inner side of the lower cavity. Thus, when the base material is seated on the lower cavity, the lower electrode terminal 121 contacts the base material at the same time. Once a bent portion of the "U"-shaped cross section of the base material is seated on the lower cavity, the upper mold 110 moves downward to pressurize the both end portions of the "U"-shaped cross section inward, and finally when the upper mold 110 and the lower mold 120 are coupled with each other and the upper mold 110 reaches a bottom dead point, the both end portions of the "U"-shaped cross section contact each other. As a result, the base material is formed to have an "O"-shaped cross section.

The upper electrode terminal 111 embedded in the upper mold 110 may contact the "U"-shaped end portions of the base material at the same time that the "O"-shaped cross section of the base material is formed. Importantly, the upper electrode terminal 111 is prevented from contacting the base material before the "O"-shaped cross section of the base material is completely formed. In other words, the conducting state should be established after the cross section of the base material has a complete "O"-shape to thus complete a pipe shape of the base material.

Figure 3:
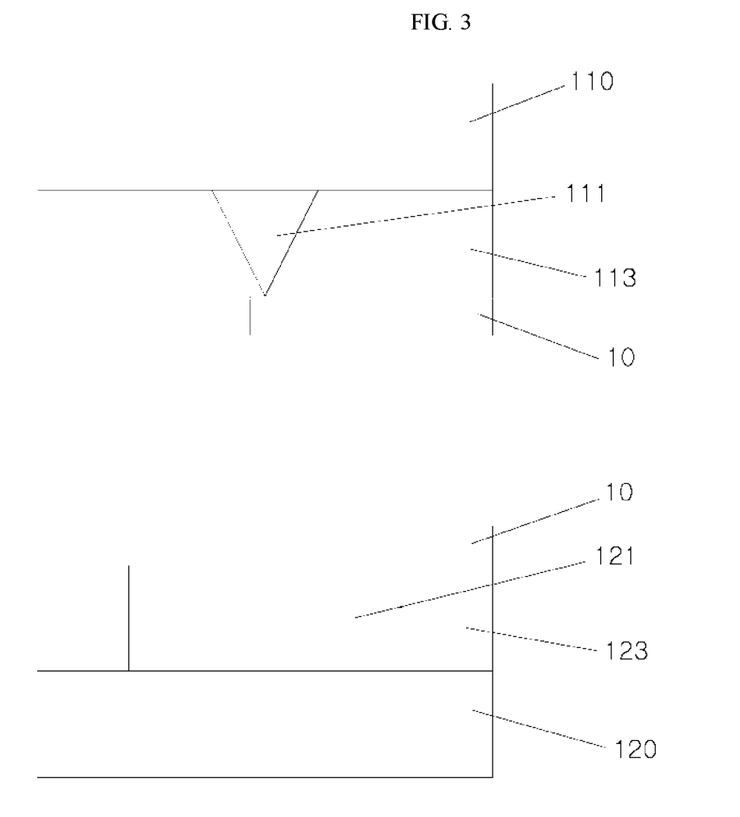
FIG. 3 is a diagram illustrating a structure of upper and lower electrode terminals in the manufacturing apparatus of FIG. 2 in detail according to an exemplary embodiment of the present invention.

In particular, as will be described below, the base material is conducted to heat treating an external pipe configuring the base material by an induction heating method to improve strength, and the strength of the external pipe formed using a quenchable steel plate is increased to about 1470 MPa after heat treatment. Thus, when the heat treatment is performed before the base material is completely molded to have a pipe shape with the mold, cold press molding may be difficult to perform. Therefore, the upper electrode terminal 111 may have an inverted triangle-shaped cross section as illustrated in FIG. 3, and a lower end portion of the inverted triangle and the both end portions of the "U"-shaped cross section of the base material contact each other.

When the base material contacts the upper and lower electrode terminals 111 and 121 simultaneously as described above, a current of about 4 Ka flows for about 1000 ms, the base material becomes a resistor and is heated to about 800° C. or more with resistive heat by induction heating until a microstructure of a first steel plate 10 configuring the base material reaches an austenite region as will be described below. When the heated base material is quenched at a constant speed, the microstructure of the first steel plate 10 may be transformed into a martensite structure, as a result, the strength is increased from about 590 MPa to 1470 MPa. Further, a plurality of cooling water passages 112 and 122 may be formed around the base material in the upper mold 110 and the lower mold 120, and the base material may be cooled by cooling water flowing in the cooling water passages 112 and 122. In particular, insulating layers 113 and 123 may each be formed at surfaces of the upper cavity and the lower cavity to prevent the current applied to the base material from being transferred to the mold after the molding of the base material is completed. The insulating layers 113 and 123 may be formed of a bakelite resin.

As will be described below, the base material may be formed by stacking a second steel plate 20 functioning as a strength reinforcing material to reinforce strength of the external pipe on the first steel plate 10 that will be the external pipe, and bonding the first steel plate 10 and the second steel plate 20 by spot-welding. The first steel plate 10 may be a quenchable steel plate capable of substantially increasing strength by heat treatment, and as the second steel plate 20, a common plate may be used. Both of the first steel plate 10 and the second steel plate 20 may have the same strength of about 590 MPa before heat treatment, and after the heat treatment by the above-described method, only the strength of the first steel plate 10 configuring the external pipe may be substantially increased to about 1470 MPa. However, the quenchable steel material and the heat treatment method thereof correspond to known technologies, thus detailed description thereof will be omitted.

Figure 1:
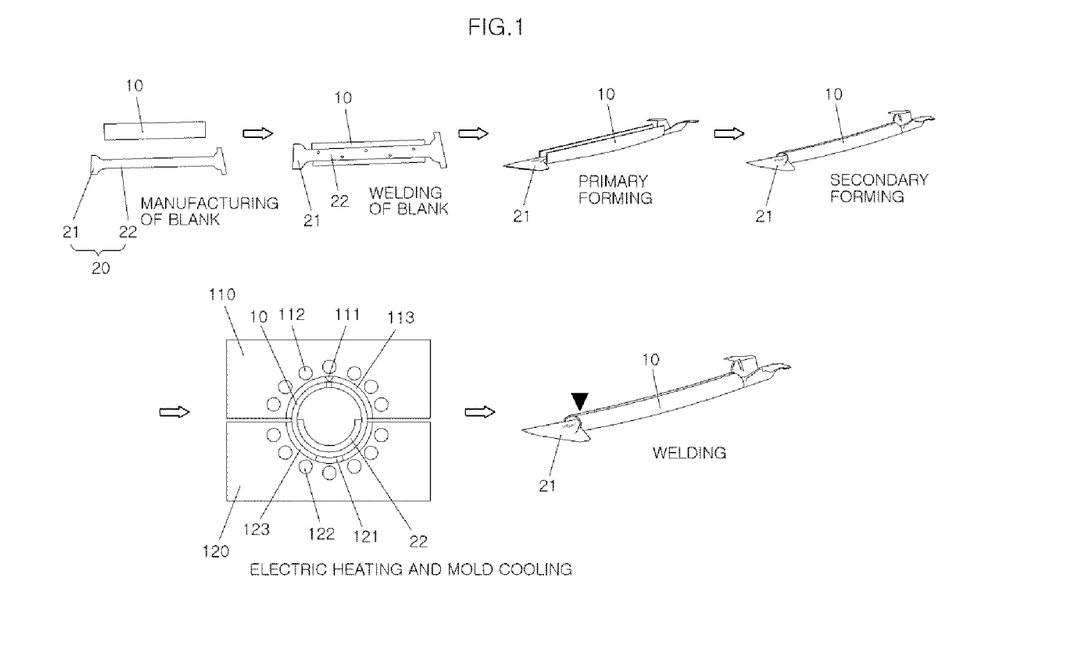
FIG. 1 is a diagram for describing a method for manufacturing a bracket-integrated double-layer door impact beam according to an exemplary embodiment of the present invention.
Figure 7:
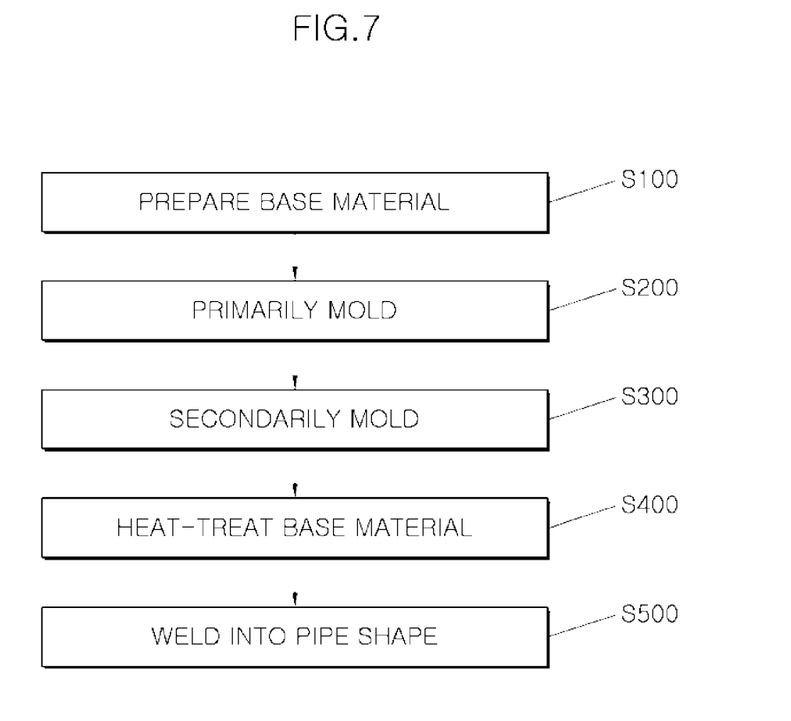
FIG. 7 is a flowchart for describing the method for manufacturing a bracket-integrated double-layer door impact beam according to an exemplary embodiment of the present invention.

FIG. 1 is a diagram for describing a method for manufacturing a bracket-integrated double-layer door impact beam according to an exemplary embodiment of the present invention, and FIG. 7 is a flowchart for describing the method for manufacturing a bracket-integrated double-layer door impact beam according to an exemplary embodiment of the present invention.

Referring to FIGS. 1 and 7, the method for manufacturing a bracket-integrated double-layer door impact beam according to an exemplary embodiment of the present invention may include: preparing a base material in which a first steel plate 10 and a second steel plate 20 are stacked and bonded; primarily press-molding the base material to have a "U"-shaped cross section; secondarily press-molding the primarily press-molded base material to have an "O"-shaped cross section; and heat-treating the secondarily press-molded base material to increase strength of the first steel plate 10.

The base material may be formed by stacking the second steel plate 20 functioning as a strength reinforcing material for reinforcing strength of the external pipe on the first steel plate 10 that will be the external pipe, and bonding the first steel plate 10 and the second steel plate 20 by spot-welding. The first steel plate 10 may be a quenchable steel plate capable of substantially increasing strength by heat treatment, and as the second steel plate 20, a common plate may be used. Both of the first steel plate 10 and the second steel plate 20 may have the same strength of about 590 MPa before heat treatment, and after the heat treatment by the above-described method, only the strength of the first steel plate 10 configuring the external pipe may be substantially increased to about 1470 MPa.

Further, in the base material, the second steel plate 20 that reinforces the strength may be stacked on a central portion of the first steel plate 10 having a rectangular shape in a width direction of the first steel plate 10, and the second steel plate 20 may be longer than the first steel plate 10 in a length direction. Bracket parts 21 configured to fix the door impact beam on an external panel of a vehicle door may be integrally formed with both end portions of the second steel plate 20 in a length direction of the second steel plate 20. Since the bracket parts 21 are integrally formed with the impact beam, the installation process may be simplified, and there is no need to separately manufacture and weld the bracket parts 21, thus it may be possible to prevent decrease in strength of welded portions due to welding.

In the primary molding step, the first steel plate 10 and the second steel plate 20 may be molded simultaneously when are stacked and bonded, and the cross section of the base material may have the "U"-shape. Importantly, the second steel plate 20 may be positioned on an inner side of the bent portion of the "U"-shape. Further, in the primary molding step, the base material may be molded to be curved at a predetermined curvature to cause a central portion of the base material in the length direction to protrude toward the bent portion direction.

Figure 4:
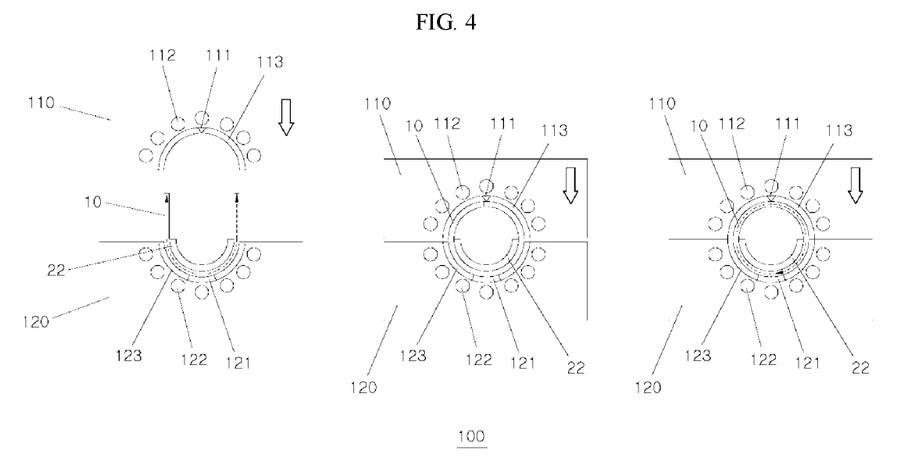
FIG. 4 is a diagram for describing a method of molding a base material into a pipe shape in the method for manufacturing a bracket-integrated double-layer door impact beam according to an exemplary embodiment of the present invention.

FIG. 4 is a diagram for describing a method of molding a base material into a pipe shape in the method for manufacturing a bracket-integrated double-layer door impact beam according to an exemplary embodiment of the present invention. Referring to FIG. 4, in the secondary molding step, once the bent portion of the "U"-shaped cross section of the base material is seated on the lower cavity as described above, the upper mold 110 may be configured to move downward to pressurize the both end portions of the "U"-shaped cross section inward, and finally when the upper mold 110 and the lower mold 120 are coupled with each other and the upper mold 110 reaches a bottom dead point, the both end portions of the "U"-shaped cross section contact each other. As a result, the base material may be formed with an "O"-shaped cross section.

Additionally, the upper electrode terminal 111 embedded in the upper mold 110 contacts the "U"-shaped end portions of the base material at the same time that the "O"-shaped cross section of the base material is formed. Accordingly, as the base material contacts the lower electrode terminal 121 and the upper electrode terminal 111 simultaneously, a current (e.g., a direct current) may be applied to the base material.

The heat-treating step may be performed using the current applied to the base material. When the base material contacts the upper and lower electrode terminals 111 and 121 simultaneously as described above, a current of about 4 Ka flows for about 1000 ms, the base material becomes a resistor and is heated to about 800° C. or more with resistive heat by induction heating until a microstructure of the first steel plate 10 configuring the base material reaches an austenite region as will be described below. Additionally, a plurality of cooling water passages 112 and 122 may be formed around the base material in the upper mold 110 and the lower mold 120, and the base material may be cooled by cooling water flowing in the cooling water passages 112 and 122.

When the heated base material is quenched at a substantially constant speed, the microstructure of the first steel plate 10 may be transformed into a martensite structure, as a result, the strength may be increased from about 590 MPa to 1470 MPa. Further, insulating layers 113 and 123 may each be formed at surfaces of the upper cavity and the lower cavity to prevent the current applied to the base material from being transferred to the mold after the molding of the base material is completed. The insulating layers 113 and 123 may be formed of a bakelite resin. After the heat-treating, both end portions of the base material may be welded along the length direction to form an external pipe.

Figure 5:
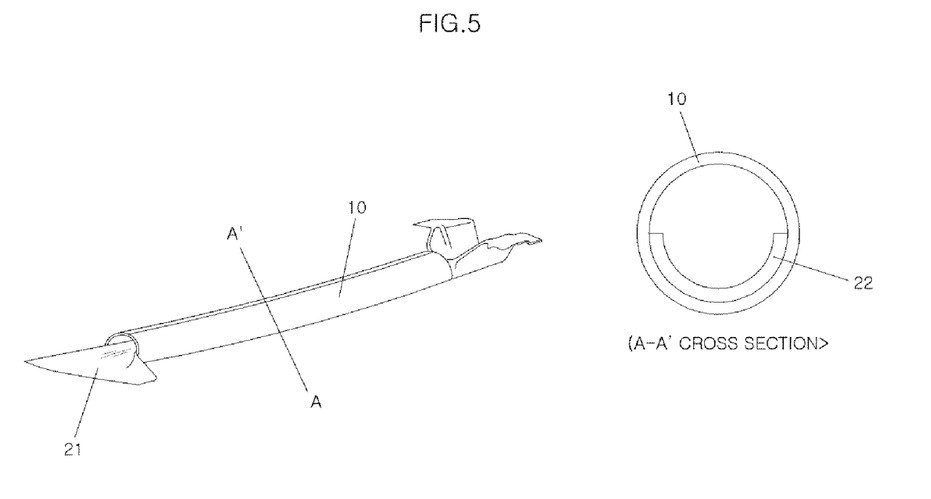
FIG. 5 is a diagram illustrating a bracket-integrated double-layer door impact beam according to an exemplary embodiment of the present invention, and a cross section thereof.

FIG. 5 is a diagram illustrating a bracket-integrated double-layer door impact beam according to an exemplary embodiment of the present invention, and a cross section thereof. Referring to FIG. 5, the bracket-integrated double-layer door impact beam according to an exemplary embodiment of the present invention may be configured to include an external pipe having a predetermined length and diameter and may be made of a quenchable steel material; and a strength reinforcing member having a body part 22 that has a half-pipe shape and bonded to a lower inner circumference of the external pipe to reinforce strength of the external pipe.

In particular, the bracket parts 21 configured to fix the impact beam on the door panel may be integrally formed with both end portions of the body part 22 in the length direction, respectively, and each of the bracket parts 21 may be formed to protrude further than the both end portions of the external pipe in the length direction. Further, the strength of the external pipe may be greater than that of the strength reinforcing member, and as described above, tensile strength of the external pipe may be increased to about 1470 MPa through heat treatment.

The tensile strength of the external pipe may be substantially increased through the heat treatment, however, elongation of the external pipe becomes about 6%. Although the strength reinforcing member is heated together, strength thereof is not increased since the strength reinforcing member is made of a common steel plate, and thus the strength reinforcing member has tensile strength of about 590 MPa, with an elongation of about 30%. Accordingly, even when the impact beam is deformed due to impact, a possibility of a fracture occurrence may be decreased due to the strength reinforcing member bonded in the impact beam and elongation may be improved, as a result, it may be possible to prevent excessive deformation caused by fracture.

Figure 6:
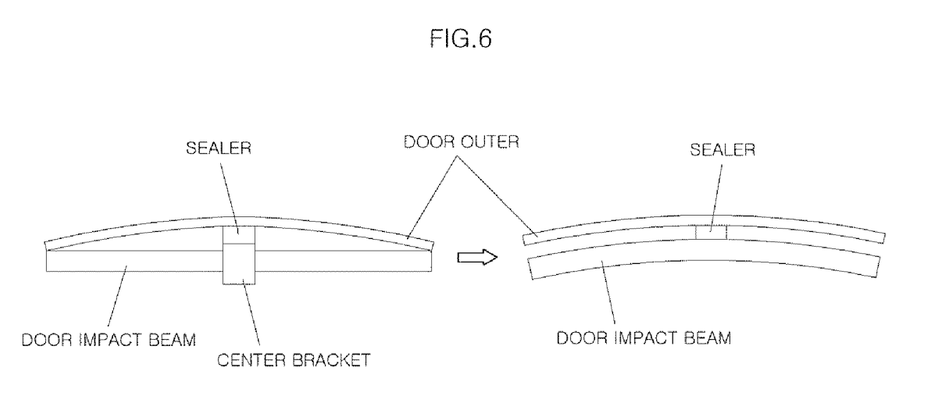
FIG. 6 is a diagram illustrating an installation state of the bracket-integrated double-layer door impact beam according to an exemplary embodiment of the present invention.

Since the strength reinforcing member may be molded to have a half-pipe shape, it may be bonded to only the lower inner circumference of the external pipe. In other words, since the strength reinforcing member may be used only for a direction requiring strength reinforcement, it may be possible to reduce weight as compared to entirely applying the strength reinforcing member. Further, since the impact beam may be curved at a predetermined curvature to cause a central portion of the impact beam in the length direction to protrude in a direction in which the strength reinforcing member is bonded, a central bracket may be removed as illustrated in FIG. 6, and since the strength reinforcing member may be bonded in the inner circumference in a direction in which the external pipe protrudes, it may be possible to efficiently handle impact applied at side surfaces.

In accordance with exemplary embodiments of the present invention, only a part of the door impact beam that requires strength reinforcement is configured to have a double layer structure, thereby securing high strength and light weight. Further, the bracket may be integrally formed with the impact beam to reduce the number of parts, thereby simplifying the process. It may also be possible to simultaneously secure strength and toughness of the parts during a collision by configuring the strength reinforcing member bonded in the inside using a material with low strength.

The foregoing exemplary embodiments are merely examples to allow a person having ordinary skill in the art to which the present invention pertains (hereinafter, referred to as those skilled in the art) to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. An apparatus for manufacturing a bracket-integrated double-layer door impact beam, comprising:
   a lower mold having a lower cavity formed with a base material molded to have a "U"-shaped cross section and a predetermined length, wherein the base material is seated on an inner surface of the lower cavity;
   a lower electrode terminal disposed in the lower mold to contact the base material electrically;
   an upper mold having an upper cavity formed therein and coupled with the lower mold to pressurize both end portions of the "U"-shaped cross section of the base material inward to form the base material to have an "O"-shaped cross section; and
   an upper electrode terminal disposed in the upper mold to contact the base material electrically, wherein the apparatus further includes a power supply device configured to be electrically connected to each of the upper electrode terminal and the lower electrode terminal.

2. The apparatus of claim 1, wherein one surface of the lower electrode terminal is exposed to an inner side of the lower cavity to contact the base material.

3. The apparatus of claim 2, wherein the upper electrode terminal contacts the base material at the same time that the "O"-shaped cross section of the base material is formed.

4. The apparatus of claim 3, wherein the upper electrode terminal is formed to have an inverted triangle-shaped cross section, and a lower end portion of the inverted triangle contacts the both end portions of the "U"-shaped cross section of the base material.

5. The apparatus of claim 3, wherein as the base material contacts the lower electrode terminal and the upper electrode terminal simultaneously, the base material is applied with a current and is induction-heated.

6. The apparatus of claim 5, wherein an insulating layer is formed at a surface of each of the upper cavity and the lower cavity.

7. The apparatus of claim 6, wherein the insulating layer includes a bakelite resin.

8. The apparatus of claim 5, wherein the upper mold and the lower mold further include cooling water passages configured to cool the heated base material, respectively.

9. A method for manufacturing a bracket-integrated double-layer door impact beam, comprising:
preparing a base material in which a first steel plate and a second steel plate are stacked and bonded;
primarily press-molding the base material to have a "U"-shaped cross section;
secondarily press-molding the primarily press-molded base material to have an "O"-shaped cross section; and
heat-treating the secondarily press-molded base material to increase strength of the first steel plate.

10. The method of claim 9, wherein the first steel plate is a quenchable steel plate.

11. The method of claim 9, wherein in the preparing of the base material, the second steel plate for reinforcing strength is stacked on a central portion of the first steel plate having a rectangular shape in a width direction of the first steel plate, and the second steel plate is longer than the first steel plate in a length direction.

12. The method of claim 9, wherein in the primary molding step, the cross section of the base material has a "U"-shape, and the second steel plate is positioned on an inner side of a bent portion of the "U"-shape.

13. The method of claim 12, wherein in the primary molding step, the base material is molded to be curved at a predetermined curvature to cause a central portion of the base material in a length direction to protrude toward the bent portion direction.

14. The method of claim 9, wherein the heat-treating includes:
heating the base material to an austenite transformation temperature or greater; and
cooling the heated base material to transform a microstructure of the first steel plate into a martensite structure.

15. The method of claim 14, wherein the heating step is performed by an induction heating.

16. The method of claim 11, wherein bracket parts configured to fix the door impact beam on an external panel of a door of a vehicle are integrally formed with both end portions of the second steel plate in a length direction of the second steel plate.

17. A bracket-integrated double-layer door impact beam installed on a door panel for cushioning an impact applied to the vehicle, comprising:
an external pipe configured to have a predetermined length and a predetermined diameter and be made of a quenchable steel material; and
a strength reinforcing member configured to have a body part with a half-pipe shape, wherein the strength reinforcing member is bonded to a lower inner circumference of the external pipe to reinforce strength of the external pipe,
wherein bracket parts configured to fix the impact beam on the door panel are integrally formed with both end portions of the body part in a length direction of the body part, respectively, and
wherein the strength of the external pipe is increased by heat treatment.

18. The bracket-integrated double-layer door impact beam of claim 17, wherein each of the bracket parts is formed to protrude further than both end portions of the external pipe in a length direction of the external pipe.

19. The bracket-integrated double-layer door impact beam of claim 17, wherein the strength of the external pipe is greater than strength of the strength reinforcing member.

20. The bracket-integrated double-layer door impact beam of claim 17, wherein the impact beam is curved at a predetermined curvature to cause a central portion of the impact beam in the length direction of the impact beam to protrude in a direction in which the strength reinforcing member is bonded.

* * * * *